Figures 1, 6:
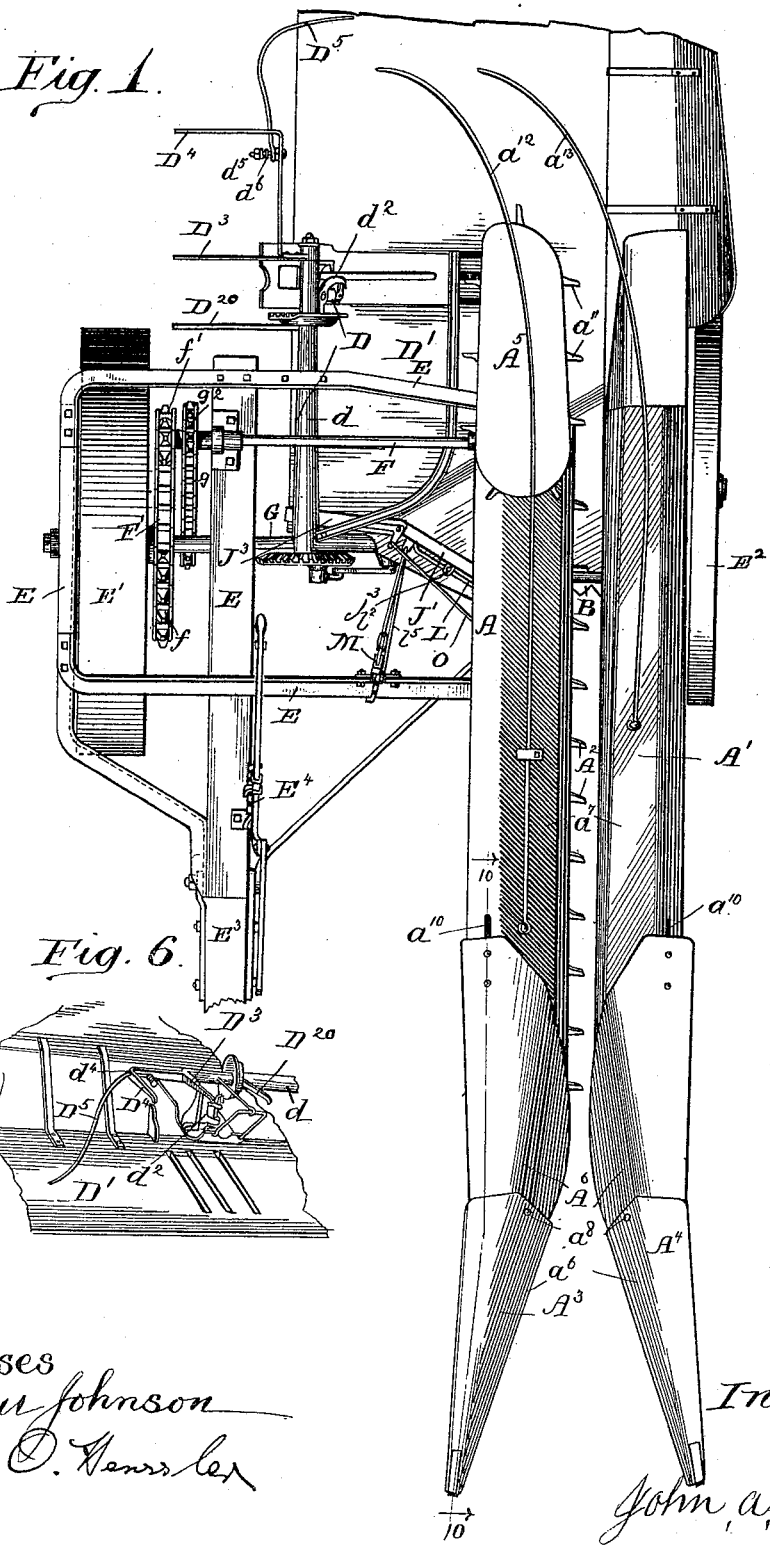

No. 640,046. Patented Dec. 26, 1899.
J. A. STONE.
CORN HARVESTER.
(Application filed Dec. 7, 1896.)
(No Model.) 4 Sheets—Sheet 1.

Witnesses
Arthur Johnson
Louis O. Hensley

Inventor
John A. Stone

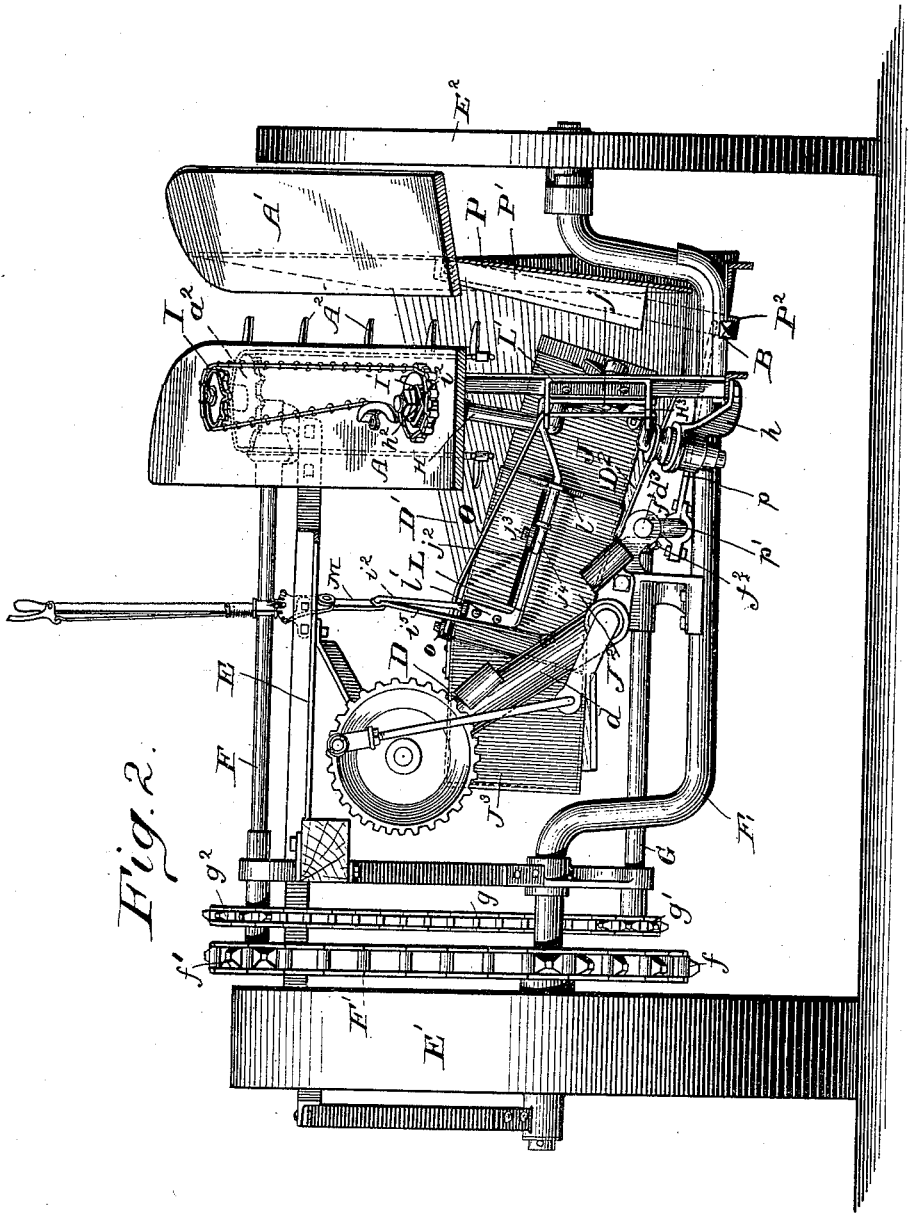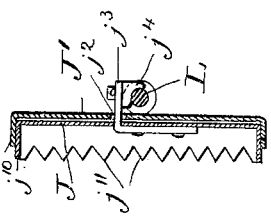

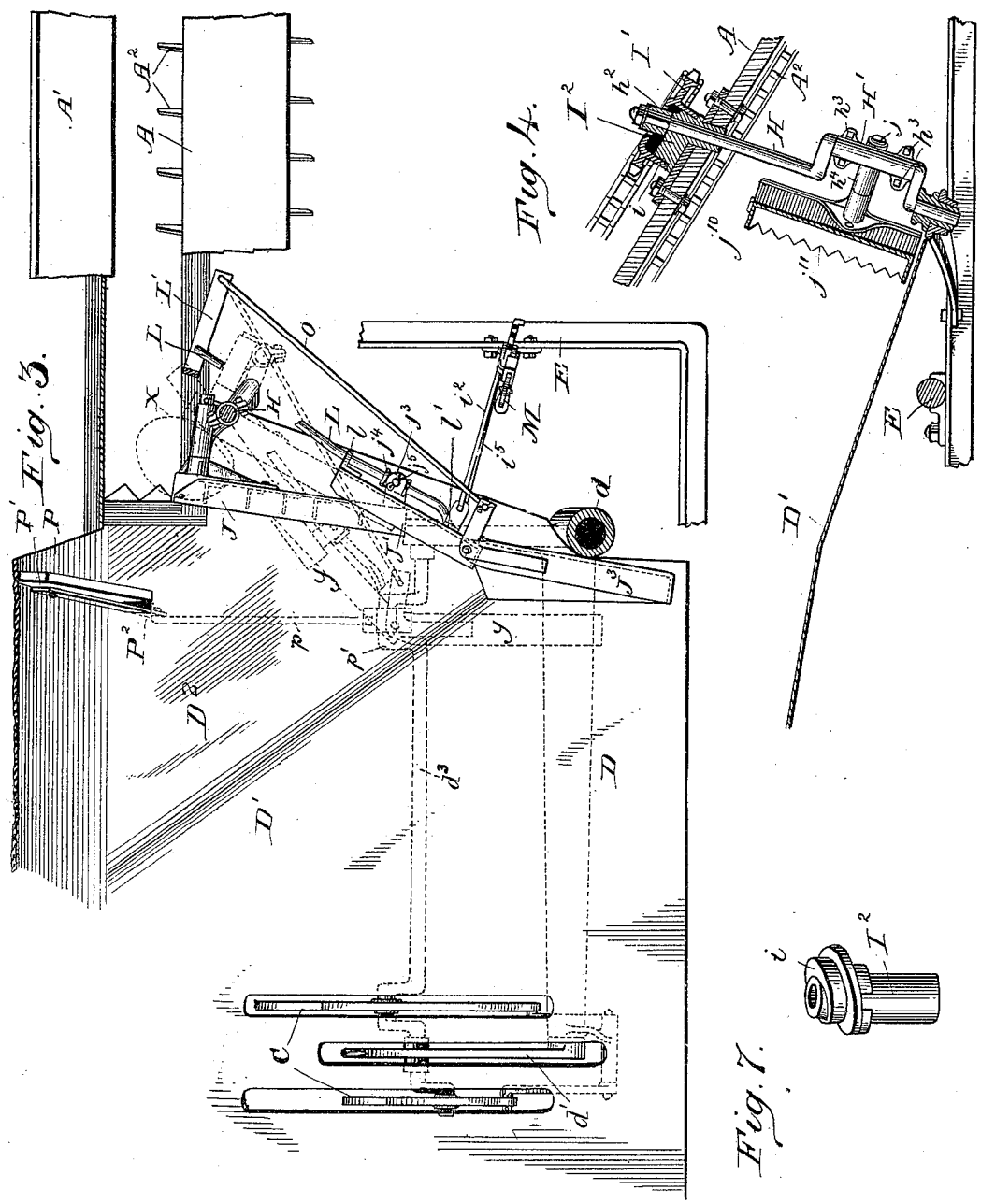

No. 640,046. Patented Dec. 26, 1899.
J. A. STONE.
CORN HARVESTER.
(Application filed Dec. 7, 1896.)
(No Model.) 4 Sheets—Sheet 4.
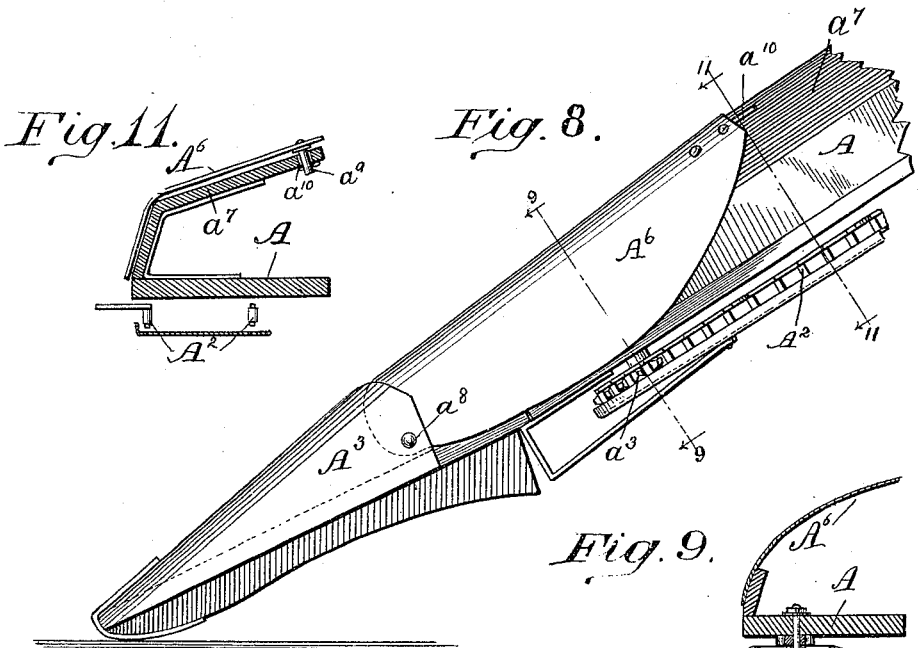
Fig. 11.
Fig. 8.
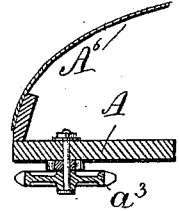
Fig. 9.
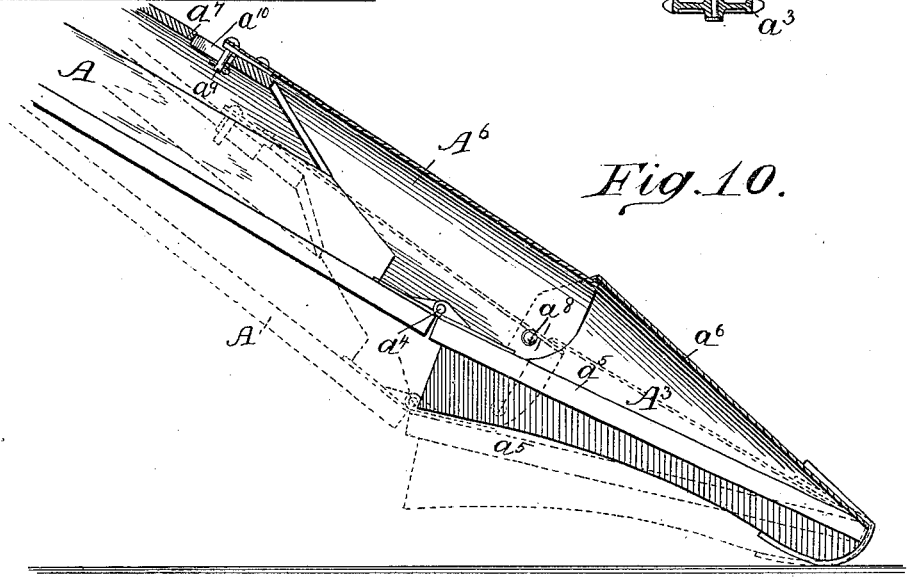
Fig. 10.
Witnesses
Arthur Johnson
Louis D. Henssler
Inventor
John A. Stone

UNITED STATES PATENT OFFICE.

JOHN A. STONE, OF CHICAGO, ILLINOIS, ASSIGNOR TO THE DEERING HARVESTER COMPANY, OF SAME PLACE.

CORN-HARVESTER.

SPECIFICATION forming part of Letters Patent No. 640,046, dated December 26, 1899.

Application filed December 7, 1896. Serial No. 614,675. (No model.)

*To all whom it may concern:*

Be it known that I, JOHN A. STONE, of Chicago, in the county of Cook and State of Illinois, have invented certain new and useful Improvements in Corn-Harvesters, of which the following is a full and clear description, reference being had to the accompanying drawings, in which—

Figure 1 is a plan view of as much of a machine as is necessary to show my improvements. Fig. 2 is a front elevation, the front portion of the gathering devices being cut away and shown in section. Fig. 3 is a plan view showing the butt-adjuster and its mechanism. Fig. 4 is a sectional elevation showing the mechanism of the adjuster. Figs. 5 and 7 are details of the adjuster. Fig. 6 is a perspective view showing the head-supporting arm, and Figs. 8, 9, 10, and 11 are details of the gathering devices.

My invention relates to that class of corn harvesters and binders shown in an application filed by me June 28, 1894, and bearing the serial number 515,957; and it consists in various improvements upon that machine which will be hereinafter pointed out.

The gathering devices consist in rearwardly-inclining boards A and A', forming between them a passage-way through which the cornstalks pass as the machine progresses along the row of corn being operated upon, and a gathering-chain $A^2$, having picker-teeth, the said chain suitably mounted upon sprocket-wheels $a^2$ and $a^3$, that are supported upon the gatherer-board A. In my practical use I have supported the gathering-chain in many ways and have used two chains a number of times. Therefore, as far as described, the gathering devices shown in the drawings may be considered as any form of chain gatherer.

To the forward and lower extremities of the gatherer-boards are extensions $A^3$ and $A^4$, so hinged thereto as to be adapted to float upon the ground.

Referring to Fig. 10, which is a section on the line 10 10 of Fig. 1, the hinge $a^4$ is shown as connecting the board $a^5$ of the extension $A^3$ to the gatherer-board A. When the machine is tilted upon its supporting-wheels for the purpose of picking up down corn or cutting closer to the ground, the extensions move upon their hinges freely, the forward end of the extension being sled-runner shaped, so as to ride upon the ground.

Shields $a^6$ are preferably used to form a substantially rounded surface for the extensions to adapt them to slide under down and fallen stalks and as much as possible avoid sundering the already broken stalks. The gatherer-boards are also provided with shields $a^7$, constructed in any familiar way, so as to present a smooth rounded surface for the stalks as they pass therealong. In order that the rounded surfaces may be continuous from the extensions to the gatherer-boards proper in any position that the gatherers and extensions may assume relative to each other, bridging-shields $A^6$ are provided, either pivoted, as shown, to the extensions at $a^8$ and adapted to slide upon the shields $a^7$ or in any other convenient way made to bridge over the space between the shield on the extension and that on the gatherer-board. I prefer the way shown—that is, to hinge the bridging-shields at $a^8$ upon the extensions and adapt them to slide upon the gatherer-shields $a^7$, being held thereto by pins $a^9$, secured to the bridge-shields, which pins are held in slots $a^{10}$ by means of a cotter or any other well-known devices.

The cross-sectional views Figs. 9 and 11 are for the purpose of showing the preferred construction of the rounded surfaces of the various shields thus described.

$A^5$ is a deflector mounted at the delivery end of the gatherer-board A, its chain $a^{11}$ having picker-teeth that serve to carry the stalks after being cut by the cutting apparatus B onto the said table.

$a^{12}$ and $a^{13}$ are deflecting-rods for the purpose of guiding the stalks on their way to the binding-table.

D is a binder attachment having a binding-table D', slightly elevated above the floor of the machine, which slopes upwardly and rearwardly, as shown at $D^2$, a frame $d$, the usual needle $d'$, knotter $d^2$, and driving-shaft $d^3$, which driving-shaft has cranks, upon which the usual packers C' are hung.

$D^{20}$, $D^3$, and $D^4$ are the discharge-arms of the binder, the one $D^4$ being extended rearward for the purpose of acting well toward the end of the bundle. A curved rod $D^5$ is attached to the discharge-arm $D^4$, preferably by being inserted through an aperture $d^4$ therein, and secured thereto by means of a bolt $D^5$ and a spring $d^6$, thereby giving it flexibility sufficient to prevent bending or breakage by striking incoming stalks or ears of corn, which rod extends rearwardly and downwardly in an irregular curve for the purpose of supporting the heads of the cornstalks as they lie on the binder-table. Being secured to the discharge-arm, or, broadly speaking, to the knotter-shaft of the binder, this bent arm is adapted to hold the upper end of the stalks during the time occupied in the accumulation of the bundle and when the parts directly concerned in the operation of binding are given movement move away therefrom in order that the bundle may be discharged.

The gathering, cutting, and binding devices are conveniently supported upon suitable framework E, and the entire machine is carried upon ground-wheels $E'$ and $E^2$. The machine is adapted to be tilted upon the axles of its supporting-wheels, and the tongue $E^3$ is jointed to the frame and connected by the usual tilting mechanism $E^4$ thereto for the purpose of holding the machine in any desired position of tilt. The gathering-chain $A^2$ receives its movement from a shaft F, which is caused to be rotated by a drive-chain $F'$, thrown over sprocket-wheels $f$ and $f'$.

G is a shaft given rotation by means of the chain $g$ and sprocket-wheels $g'$ and $g^2$ from the shaft F. Bevel-gears $f^2$ and $f^3$ transmit rotation from the shaft G to the packer-shaft $d^3$. The arrangement of gearing, as shown and described, may be considered as any convenient form of gearing that will serve the purpose of giving the proper movement to the various shafts.

A crank-shaft H is suitably supported at its upper end upon the gatherer-board A and at its lower end upon the bracket $h$.

Referring to Fig. 2, it will be noticed that the axis of the shaft H is not at right angles to the binding-table and that in order that the butt-board may be kept close to the deck special means must be employed. I prefer to use the means shown in the drawings—namely, the two-way joint between said butt-board and said shaft. The crank-shaft may be conveniently given rotation by a special device that is shown in the drawings and that will now be described.

I is a sprocket-wheel secured to the driving-spindle of the gatherer-chain, and $I'$ is a sprocket-wheel supported upon the journal-bearing $I^2$ at the upper end of the shaft H, the said bearing having also an eccentric diagonal bearing $i$ as one part therewith, the plane of which is parallel to the plane of the gatherer-board. The sprocket-wheel $I'$ is adapted to rotate upon the said eccentric bearing and has formed in its hub an angular opening $i^2$. The angular collar $h^2$ is secured to the upper end of the crank-shaft and projects through the angular aperture $i^3$, so as to be rotated by the sprocket-wheel $I'$.

J is a butt-board having a stud $j$ projecting therefrom. A sleeve $H'$, preferably made in two pieces in order to be conveniently attached upon the crank-shaft H and secured together by bolts $h^3$ or similar means, has as one part therewith a sleeve $h^4$, adapted to receive the stud $j$. The board J is thus actuated by the crank and given an orbital movement at its receiving end, as shown by the dotted lines X. (See Fig. 3.) The delivery end of the board J is adapted to slide upon the board $J'$, as will now be described.

A radius-rod L is pivoted conveniently at $L'$ upon the frame of the machine and extends diagonally forward to be secured at $l$ and $l'$ to the board $J'$. A slot $j^2$ is formed in the said board $J'$, and a lug $j^3$, as one part with the moving board J, projects through the said slot and is adapted to be pivoted, as at $j^5$, to a sleeve $j^4$, that slides upon the rod L. That portion of the radius-rod that is secured to the delivery end of the board $J'$ is bent forwardly to form a lug, to which the rod $l^2$ is pivoted to connect it to the hand-lever M.

For the purpose merely of making the device secure and durable a second rod $l^5$ extends from the delivery end of the butt-board to the hand-lever M. The purpose of the hand-lever is to adjust the board $J'$, carrying the delivery end of the board J with it, fore and aft by swinging the said board $J'$ upon the radius-rod L.

In Fig. 3 the forward position of adjustment of the butt-moving devices is shown in full lines. The position shown in dotted lines at $y$ is a more rearward adjustment of the devices.

Pivoted to the delivery end of the butt-board is an extension $J^3$, against which the butts of the stalks of the forming bundle lie in order that their position in the binder-receptacle may be maintained and a bundle having a "square butt" be obtained. The extension is held in a position substantially at right angles to the lengths of stalks being operated upon by means of a radius-rod O, pivoted at $o$ to a lug upon said extension. The particular construction of the various boards that make up the butt-moving device, as shown in the drawings, will be now described, and such a construction is for the purpose of adapting the machine to the handling of cornstalks. The operative parts comprising this device have been called "boards;" but for the present purpose they have been constructed of sheet metal and have flanges $j^{10}$ formed upon their edges in order to give them the proper stiffness. The butt-board J, that is given the orbital movement, has aggressive slats $j^{11}$, which are preferably given a saw-tooth edge.

As before stated, the purpose of the double joint between the butt-board and its actuating-crank is to allow the butt-board to be moved in a plane substantially parallel with the upper surface of the deck, and it will be understood that sufficient looseness in the various joints is provided in order that the devices may not be cramped in the various movements which are given to them.

An auxiliary device adapted to toss the butts sidewardly in a direction to permit them to be better engaged by the butt-adjuster will now be described.

Extending rearwardly from the cutting apparatus and upwardly from the receiving edge of the binder-table is a wall P. Attached to that wall is a guiding-board P', that serves to deflect the butt-ends of the stalks sidewardly as they fall. To the upper end of the board P' is pivoted a bar $P^2$, the lower end of which is connected by means of a pitman $p$ to a crank $p'$ on the shaft $d^3$. The lower end part $P^2$ is thus given a vibrating movement, which serves to move the butts of the stalks sidewardly toward the butt-adjuster. It has been found that this device materially aids in the handling of corn in the machine shown and described, in that it serves to keep the space immediately to the rear of the cutting apparatus clear of the butts of the prostrated cornstalks and to throw them into the path of the butt-moving device. In many conditions of corn the board P' is sufficient to deflect the prostrated stalks out of the way of the incoming stalks. Should the corn being operated upon be bent and stiff, a positive movement is necessary to keep the rear of the cutting apparatus clear of the butts of the prostrated stalks, and under such conditions the moving bar $P^2$ is most effective.

What I claim as my invention, and desire to secure by Letters Patent, is—

1. The combination, in a butt-moving device, of a pivoted radius-rod, a board actuated at its receiving end by a crank, and having its opposite end adapted to slide upon the swinging end of said radius-rod, and an extension-board hung upon said radius-rod and having a slot through which said crank-actuated board is connected to said radius-rod.

2. The combination, in a butt-moving device, of a radius-rod pivoted at one end and carrying at its opposite end a board, of an oscillating board actuated at its receiving end and at its other end overlapping the first-mentioned board and connected to its radius-rod on the other side of the same.

3. The combination, in a butt-moving device, of a rotating crank, and a deck inclined to the plane of movement of said crank, with a butt-adjuster hung upon said crank by a two-way joint and having its delivery end adapted to be adjusted along said inclined deck.

4. The combination of the gatherer-board having the gathering-chain suitably sustained thereon, a crank-shaft having its upper end suitably journaled upon said gathering-board and its lower end conveniently sustained upon the framework of the machine, a shaft having a sprocket-wheel journaled upon said gathering-board, the said sprocket-wheel adapted to give movement to said gathering-chain, a second sprocket-wheel secured to said chain-driving shaft, a sprocket-wheel adapted to drive said crank-shaft, an eccentric support for said wheel has one part with the upper journal-bearing for said shaft and a chain adapted to transmit rotation from said gathering-chain shaft to the eccentrically-supported sprocket-wheel.

5. The combination of the cutting apparatus and an automatic binder positioned at the rear and to one side of said cutting apparatus, a butt-adjusting device located upon the forward edge of the table of said binder and a butt-moving device, P', located to the rear and on the opposite side of said cutting apparatus from the binder, substantially as described.

6. The combination of the cutting apparatus, an automatic binder positioned at the rear and to the side of said cutting apparatus, a butt-adjusting device located upon the forward edge of the table of said binder, and a butt-moving device consisting of a bar pivoted at its upper end and vibrating at its lower end, said device located to the rear of said cutting apparatus and upon the receiving edge of said binding-table.

7. The combination in a corn-harvester of the main frame suitably sustained upon its supporting-wheels and having the pivotally-jointed draft-tongue and tilting mechanism, gatherer-boards having a passage-way for the stalks between them and provided with hinged extensions, the said extensions adapted to ride constantly upon the ground regardless of the position to which the machine is tilted, the said boards and the said extensions having upwardly-rounded surfaces over which the said stalks may slide, and bridge-pieces hinged to and forming a continuous surface between said hinged extensions and said gatherer-boards.

8. The combination in a corn-harvester of the main frame suitably sustained upon its supporting-wheels and having the pivotally-jointed draft-tongue and tilting mechanism, gatherer-boards having a passage-way for the stalks between them and provided with hinged extensions, the said extensions adapted to ride constantly upon the ground regardless of the position to which the machine is tilted, the said boards and the said extension having upwardly-rounded surfaces over which the said stalks may slide, and bridging-shields pivoted to said hinged extensions and adapted to slide in guideways on said gatherer-boards.

JOHN A. STONE.

Witnesses:
ARTHUR JOHNSON,
LOUIS O. HENSSLER.